United States Patent
Fukano et al.

(10) Patent No.: US 6,932,320 B2
(45) Date of Patent: Aug. 23, 2005

(54) SOLENOID-OPERATED VALVE

(75) Inventors: Yoshihiro Fukano, Moriya (JP);
Masami Yoshida, Ryugasaki (JP);
Noriya Sasaki, Kasukabe (JP)

(73) Assignee: SMC Kabushiki Kaisha, Tokyo (JP)

( * ) Notice: Subject to any disclaimer, the term of this patent is extended or adjusted under 35 U.S.C. 154(b) by 85 days.

(21) Appl. No.: 10/305,124

(22) Filed: Nov. 27, 2002

(65) Prior Publication Data

US 2003/0102453 A1 Jun. 5, 2003

(30) Foreign Application Priority Data

| Dec. 4, 2001 | (JP) | .................................. | 2001-369612 |
| Dec. 4, 2001 | (JP) | .................................. | 2001-369692 |
| Dec. 4, 2001 | (JP) | .................................. | 2001-369858 |
| Dec. 4, 2001 | (JP) | .................................. | 2001-370457 |

(51) Int. Cl.$^7$ ............................................. F16K 31/06
(52) U.S. Cl. .............................. 251/129.15; 251/129.2
(58) Field of Search ........................ 251/129.15, 129.2

(56) References Cited

U.S. PATENT DOCUMENTS

| 3,814,376 A | 6/1974 | Reinicke |
| 4,056,255 A | 11/1977 | Lace |
| 5,032,812 A | 7/1991 | Banick et al. |
| 5,192,936 A | 3/1993 | Neff et al. |
| 6,206,343 B1 | 3/2001 | Kato et al. |
| 6,666,429 B2 * | 12/2003 | Fukano et al. ......... 251/129.04 |

FOREIGN PATENT DOCUMENTS

| DE | 950 391 | 10/1956 |
| EP | 0 757 200 | 4/2000 |
| EP | 1 103 992 | 5/2001 |
| JP | 58 116888 | 8/1983 |
| JP | 60-178678 | 11/1985 |
| JP | 61 73972 | 5/1986 |

* cited by examiner

*Primary Examiner*—J. Casimer Jacyna
(74) *Attorney, Agent, or Firm*—Paul A. Guss

(57) ABSTRACT

A solenoid-operated valve comprises a first valve seat formed on a valve body and communicating a first port with a second port, a guide member arranged in the valve body, a second valve seat at a substantially central open portion of the guide member, a movable iron core attracted by a fixed iron core under magnetic excitation of a solenoid, a valve plug directly connected to the movable iron core, and an elastic section attached to the valve plug and seated on the first and second valve seats when the movable iron core is displaced.

20 Claims, 18 Drawing Sheets

PRIOR ART

PRIOR ART

US 6,932,320 B2

SOLENOID-OPERATED VALVE

BACKGROUND OF THE INVENTION

1. Field of the Invention

The present invention relates to a solenoid-operated valve in which a movable iron core displaced under magnetic excitation of a solenoid is directly connected to a valve plug for opening/closing a fluid passage.

2. Description of the Related Art

Solenoid-operated valves have been hitherto used to control the flow direction of the compressed air by supplying the pressure fluid to an actuator or discharging the compressed air to the atmosphere.

For example, Japanese Laid-Open Utility Model Publication No. 60-178678 discloses a conventional solenoid-operated valve as described above. As shown in FIG. 16, the solenoid-operated valve 1 has an intake valve plug 5 for mutually switching the communication between first and second fluid ports 3, 4 of a valve body 2, and a movable iron core 8 provided with a seal member 7 for mutually switching the communication of a third fluid port 6 of the valve body 2 to function as a discharge valve. Two connecting rods 9a, 9b are inserted between the intake valve plug 5 and the movable iron core 8 in the valve body 2.

A solenoid 11 is arranged in a casing 10 disposed on an upper portion of the valve body 2. In the OFF state in which no current is supplied to the solenoid 11, the movable iron core 8 is displaced downwardly (in the direction of the arrow B) by a first spring 12. Therefore, a seal member 7 is seated on a first seat 13 to interrupt the communication between the third fluid port 6 and the inside of the solenoid-operated valve 1. Further, the valve plug 5 is displaced downwardly against the spring force of a second spring 14 by the movable iron core 8 pressing on the connecting rods 9a, 9b. As a result, the valve plug 5 is separated from a second seat 15, and the first fluid port 3 is communicated with the second fluid port 4.

When the current is supplied to the solenoid 11, then the movable iron core 8 is attracted toward a fixed iron core 16 under the magnetic excitation of an unillustrated coil, and the movable iron core 8 is displaced upwardly (in the direction of the arrow A) against the spring force of the first spring 12. Accordingly, the seal member 7 is separated from the first seat 13 and the third fluid port 6 is communicated with the inside of the solenoid-operated valve 1. Further, the valve plug 5, which is pressed by the connecting rods 9a, 9b, is seated on the second seat 15 in accordance with the spring force of the second spring 14, and the communication is interrupted between the first fluid port 3 and the second fluid port 4.

In the conventional solenoid-operated valve 1 shown in FIG. 16, the seal member 7 of the movable iron core 8 and the valve plug 5 are seated to effect the seal on the first and second seats 13, 15 in accordance with the spring forces of the first and second springs 12, 14, respectively. However, stable seating force is not obtained when the valve plug 5 presses the first and second seats 13, 15, and the response speed is not stable in opening/closing the valve plug, depending on the relationship between the respective spring forces of the first spring 12 and the second spring 14.

In order to improve the seating force on the second seat 15 on which the valve plug 5 is seated, it is necessary that the spring force of the second spring 14 is increased to press the valve plug 5 against the second seat 15. However, if the spring force of the second spring 14 is increased, the connecting rods 9a, 9b, which are inserted between the upper surface of the valve plug 5 and the lower surface of the movable iron core 8, are displaced upwardly together with the valve plug 5. Therefore, the seal member 7 is separated from the first seat 13 as the movable iron core 8 is semi-forcibly displaced upwardly when pressed by the connecting rods 9a, 9b. Therefore, it is impossible to retain the air-tightness between the third fluid port 6 and the inside of the solenoid-operated valve 1.

This problem may be solved by increasing the spring force of the first spring 12 in the same manner as in the second spring 14. However, it is difficult to adjust the balance between the spring forces of the first and second springs 12, 14. If the spring force of the first spring 12 is increased, it is necessary to increase the attracting force of the solenoid-operated valve 1, because the increased spring force acts as the resistance force when the movable iron core 8 is magnetically attracted upwardly. As a result, the electric power consumption of the solenoid-operated valve 1 is increased, and the entire apparatus of the solenoid-operated valve 1 should be large.

As shown in FIG. 17, for example, when a solenoid-operated valve 20 is used, a casing 23 is attached to an upper portion of a valve body 22 having a plurality of fluid ports 21a to 21c, and a solenoid 24 is arranged in the casing 23. The communication of the fluid ports 21a to 21c is magnetically switched by a valve mechanism 25 with the solenoid 24.

As shown in FIG. 18, a magnetic plate 28 of a magnetic material is interposed in a substantially horizontal direction between the valve body 22 and a bobbin 27 around which a coil 26 of the solenoid 24 is wound. The magnetic plate 28 has a substantially rectangular cross section. The inner circumferential surface 30 of the magnetic plate 28 opposed to the outer circumferential surface of the movable iron core 29 has a width dimension C.

When the current is supplied to the solenoid 24, the magnetic flux is generated under the magnetic excitation of the coil 26. The magnetic flux from the coil 26 goes through the inner circumferential surface 30 of the magnetic plate 28 toward the movable iron core 29, and then returns from the movable iron core 29 through the fixed iron core 31 to the coil 26. In this case, the magnetic flux is generated corresponding to the area of the inner circumferential surface 30 (see reference symbol C in FIGS. 17 and 18) of the magnetic plate 28 opposed to the movable iron core 29.

As a result, as shown in FIG. 17, the movable iron core 29 is attracted toward the fixed iron core 31, and thus the movable iron core 29 is displaced upwardly (in the direction of the arrow A). Further, a connecting member 32 and a valve plug 33 connected to the movable iron core 29 are displaced upwardly (in the direction of the arrow A). Accordingly, the fluid port 21a is communicated with the fluid port 21b.

As shown in FIG. 18, in the conventional solenoid-operated valve 20, the magnetic flux generated from the coil 26 under the magnetic excitation of the coil 26 goes through the magnetic plate 28 toward the movable iron core 29. In this arrangement, it is demanded to increase the attracting force of the movable iron core 29 generated under the magnetic excitation of the coil 26 so that the response speed of the valve plug 33 is further improved.

On the other hand, the conventional solenoid-operated valve generally adopts a method in which a movable iron core is attracted and displaced toward a fixed iron core along an inner circumferential surface of a hole of a bobbin by magnetically exciting a solenoid (electromagnet), and a valve plug is operated together with the movable iron core.

However, in the conventional solenoid-operated valve, when the movable iron core is displaced along the inner circumferential surface of the hole of the bobbin under the magnetic excitation of the solenoid, the sliding surface of the movable iron core is in surface-to-surface contact with the inner circumferential surface of the bobbin, and sliding resistance is generated. Therefore, the response speed of the solenoid-operated valve is low with respect to the electric signal supplied from a controller or the like.

Further, the movable iron core slides on the bobbin while the sliding surface of the movable iron core is in surface-to-surface contact with the inner circumferential surface of the bobbin. Therefore, the sliding portions of the movable iron core and the bobbin are abraded, and durability is lowered. As a result, maintenance cycle is shortened.

Further, it is demanded to reduce the number of parts of the conventional solenoid-operated valve, for example, in order to realize a compact size and a light weight of the solenoid-operated valve. Additionally, the fixed iron core provided opposingly and coaxially with the movable iron core occupies a relatively large ratio in the cost of the entire solenoid-operated valve.

SUMMARY OF THE INVENTION

A general object of the present invention is to provide a solenoid-operated valve which makes it possible to reduce the number of parts by directly connecting a movable iron core and a valve plug and which makes it possible to improve the seating force of the valve plug.

A principal object of the present invention is to provide a solenoid-operated valve which makes it possible to increase the magnetic flux density by allowing an end surface of a ring member facing a movable iron core to be wide and which makes it possible to increase the attracting force of the movable iron core.

Another object of the present invention is to provide a solenoid-operated valve which makes it possible to improve the response and the durability of the solenoid-operated valve by reducing the sliding resistance generated when a movable iron core is displaced in a bobbin.

Still another object of the present invention is to provide a solenoid-operated valve which makes it possible to simplify the structure by abolishing the conventional fixed iron core, thereby reducing the number of parts and decreasing the cost.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
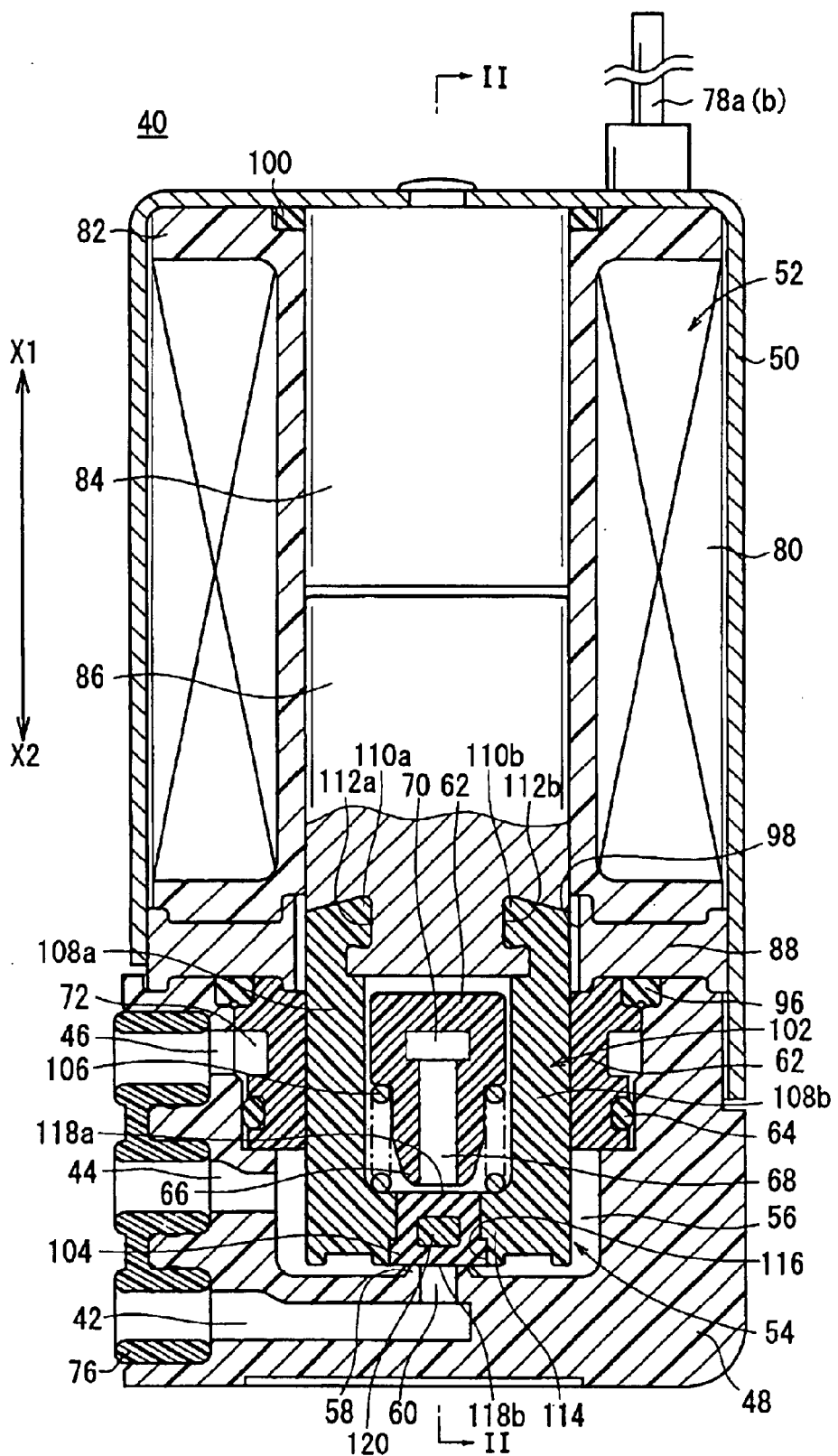
FIG. 1 is a vertical sectional view when a solenoid-operated valve according to a first embodiment of the present invention is closed.

In FIGS. 1 to 4, reference numeral 40 indicates a solenoid-operated valve according to a first embodiment of the present invention.

The solenoid-operated valve 40 comprises a valve body 48 having a plurality of first to third ports 42, 44, 46 which are spaced in parallel on a side surface of the valve body 48 by predetermined distances, a bonnet 50 which is made of a metal thin plate connected to an upper portion of the valve body 48, a solenoid 52 which is arranged in the bonnet 50, and a valve mechanism 54 which switches the communication of the first to third ports 42, 44, 46 under the magnetic excitation of the solenoid 52.

The first port 42, the second port 44, and the third port 46 are formed in the side surface of the valve body 48 in the order named from the bottom. The pressure fluid is supplied from an unillustrated pressure fluid supply source to the first port 42. The second port 44 is formed over the first port 42 so that the second port 44 is spaced from the first port 42 by the predetermined distance. The fluid is discharged from the second port 44. The third port 46 is formed over the second port 44 so that the third port 46 is spaced from the second port 44 by the predetermined distance. The third port 46 releases fluid from the inside of a chamber 56 to the atmosphere as described later on.

The chamber 56 is formed at a substantially central portion of the valve body 48 and is communicated with the first to third ports 42, 44, 46. A first valve seat 58 is formed at a substantially central lower portion of the chamber 56 and protrudes toward the chamber 56 by a predetermined length. A passage 60 is formed at a substantially central portion of the first valve seat 58 and is communicated with the first port 42 via the inside of the valve body 48.

A guide member 62 made of a resin material is attached to a step formed on the upper side of the chamber 56. A first seal member 64 is attached to a groove formed on the outer circumferential surface of the guide member 62. A second valve seat 66 is formed at a substantially central portion of the guide member 62 and protrudes by a predetermined length toward the first valve seat 58. A first communication passage 68 is formed at a substantially central portion of the second valve seat 66 and extends from an end in the axial direction. A second communication passage 70 (see FIGS. 2 and 4) is formed in the guide member 62 and communicates with the first communication passage 68. The second communication passage 70 extends substantially perpendicularly to the first communication passage 68.

The second communication passage 70 communicates with a recess 72 which is formed on the outer circumference of the guide member 62. The air-tightness is retained for the recess 72 by a first seal member 64 attached to the guide member 62 and a second seal member 96 as described later on.

Figure 2:
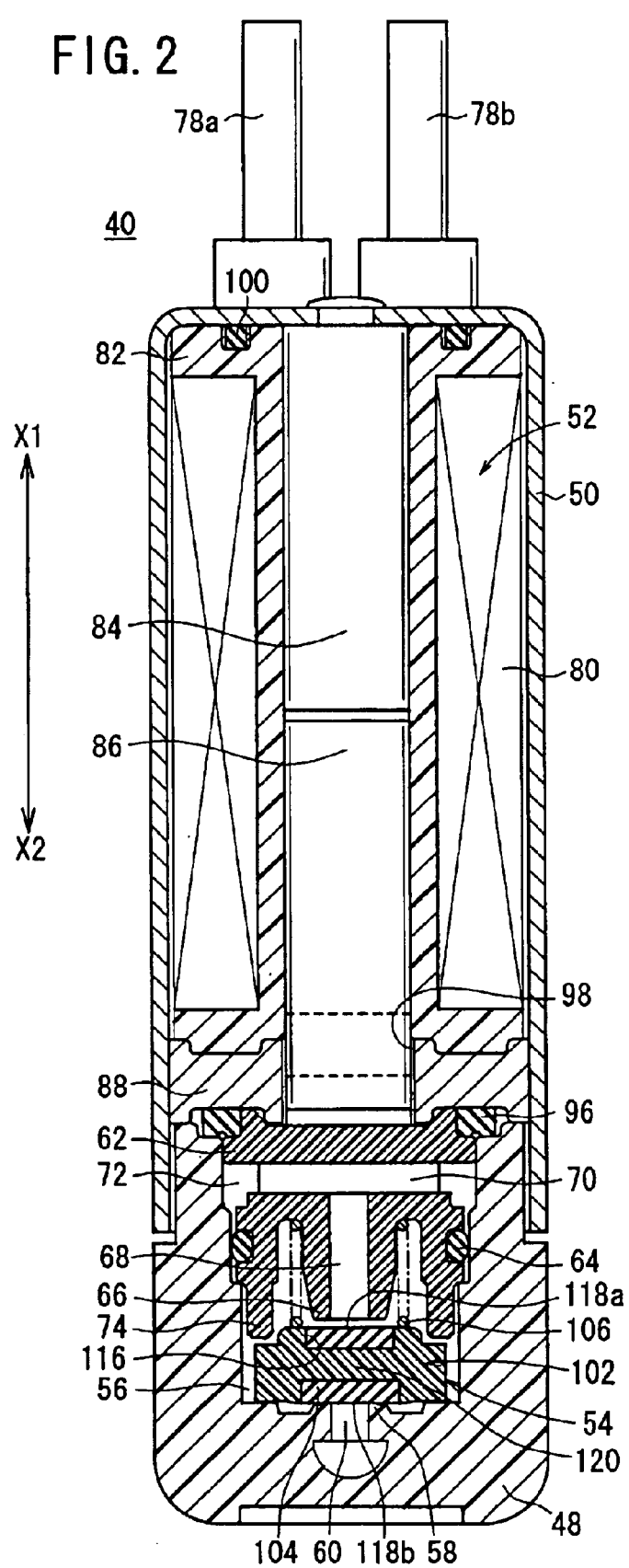
FIG. 2 is a vertical sectional view taken along a line II—II shown in FIG. 1.
Figure 4:
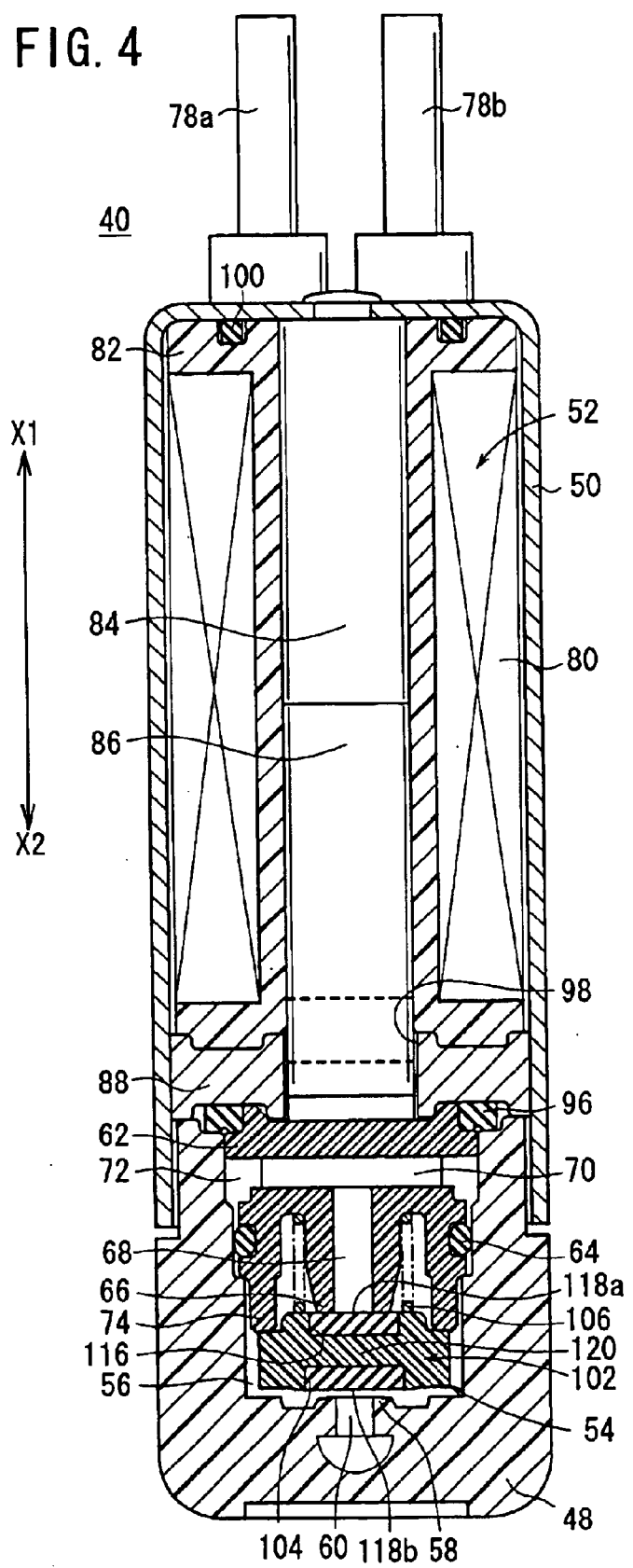
FIG. 4 is a vertical sectional view taken along a line IV—IV shown in FIG. 3.

As shown in FIGS. 2 and 4, a flange section 74 is formed on the outer side of the guide member 62 and protrudes by a predetermined length toward the first valve seat 58.

Figure 3:
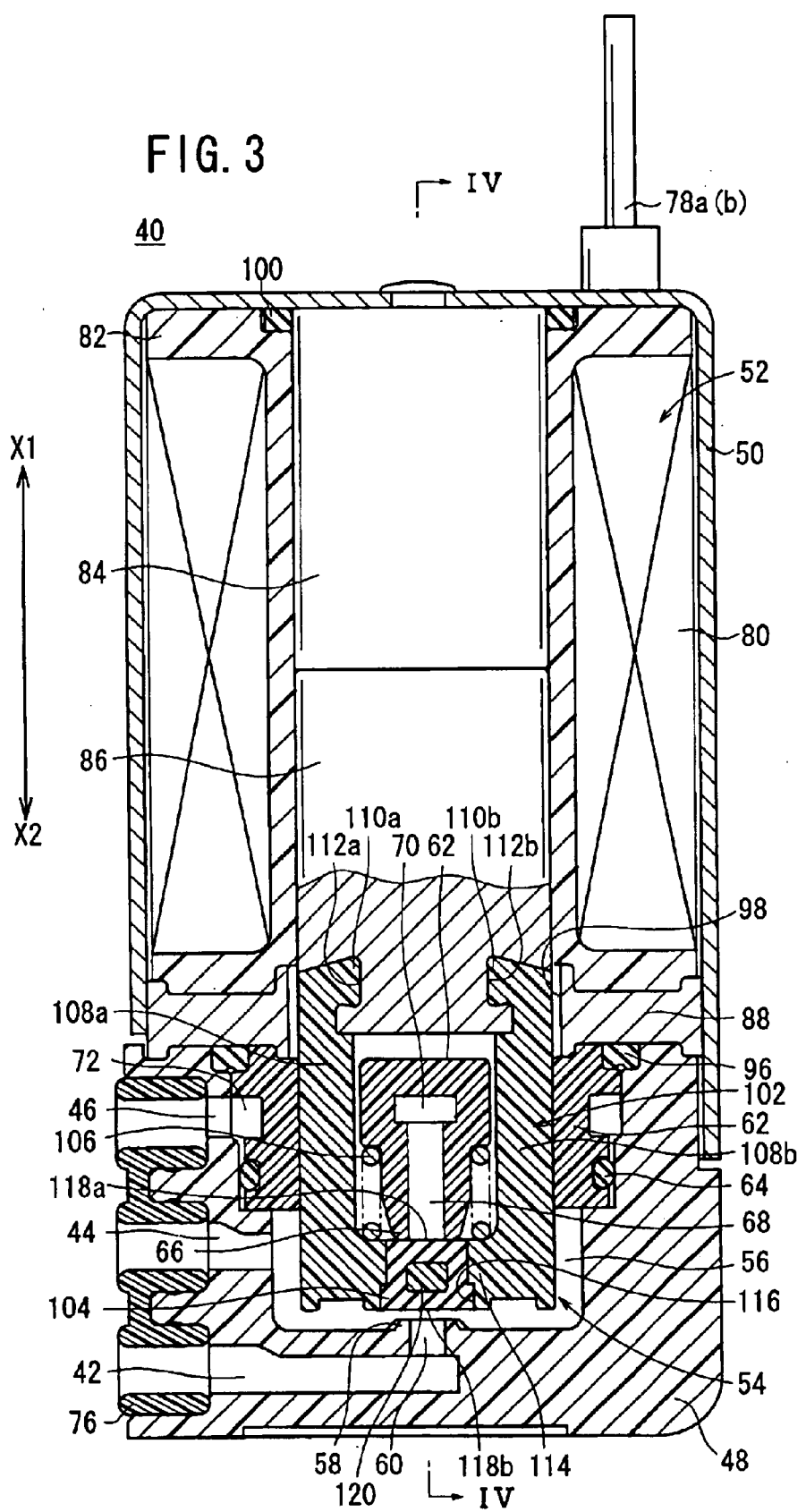
FIG. 3 is a vertical sectional view when the solenoid-operated valve shown in FIG. 1 is opened.

As shown in FIGS. 1 and 3, a gasket 76 made of an elastic material is attached to annular grooves on end surfaces of the first to third ports 42, 44, 46 to retain the air-tightness for the respective ports 42, 44, 46 when connected to another unillustrated fluid pressure-operated apparatus or the like.

A pair of lead wires 78a, 78b (see FIGS. 2 and 4) are connected to the upper surface of the bonnet 50 in order to supply the current from an unillustrated power source to the solenoid 52.

The solenoid 52 includes a bobbin 82 which is arranged in the bonnet 50 and around which a coil 80 is wound, a fixed iron core 84 which has one end connected to the bonnet 50, and a movable iron core 86 which is arranged in the bobbin 82 and which is urged in a direction away from the fixed iron core 84 by a spring member 106 as described later on. Each of the fixed iron core 84 and the movable iron core 86 has a substantially rectangular cross section.

Figure 5:
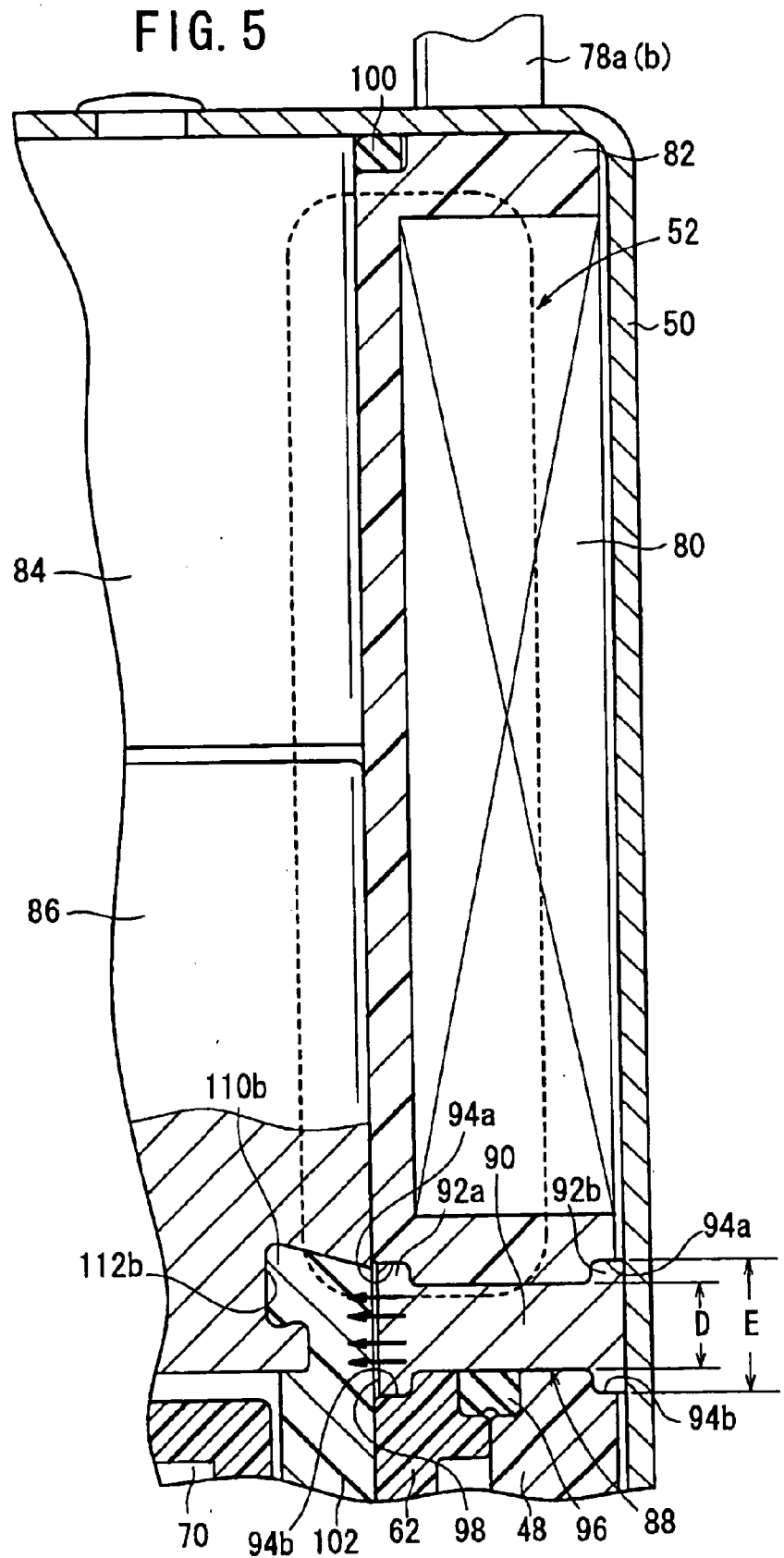
FIG. 5 is, with partial omission, a magnified vertical sectional view illustrating parts disposed in the vicinity of a ring member shown in FIG. 1.
Figure 6:
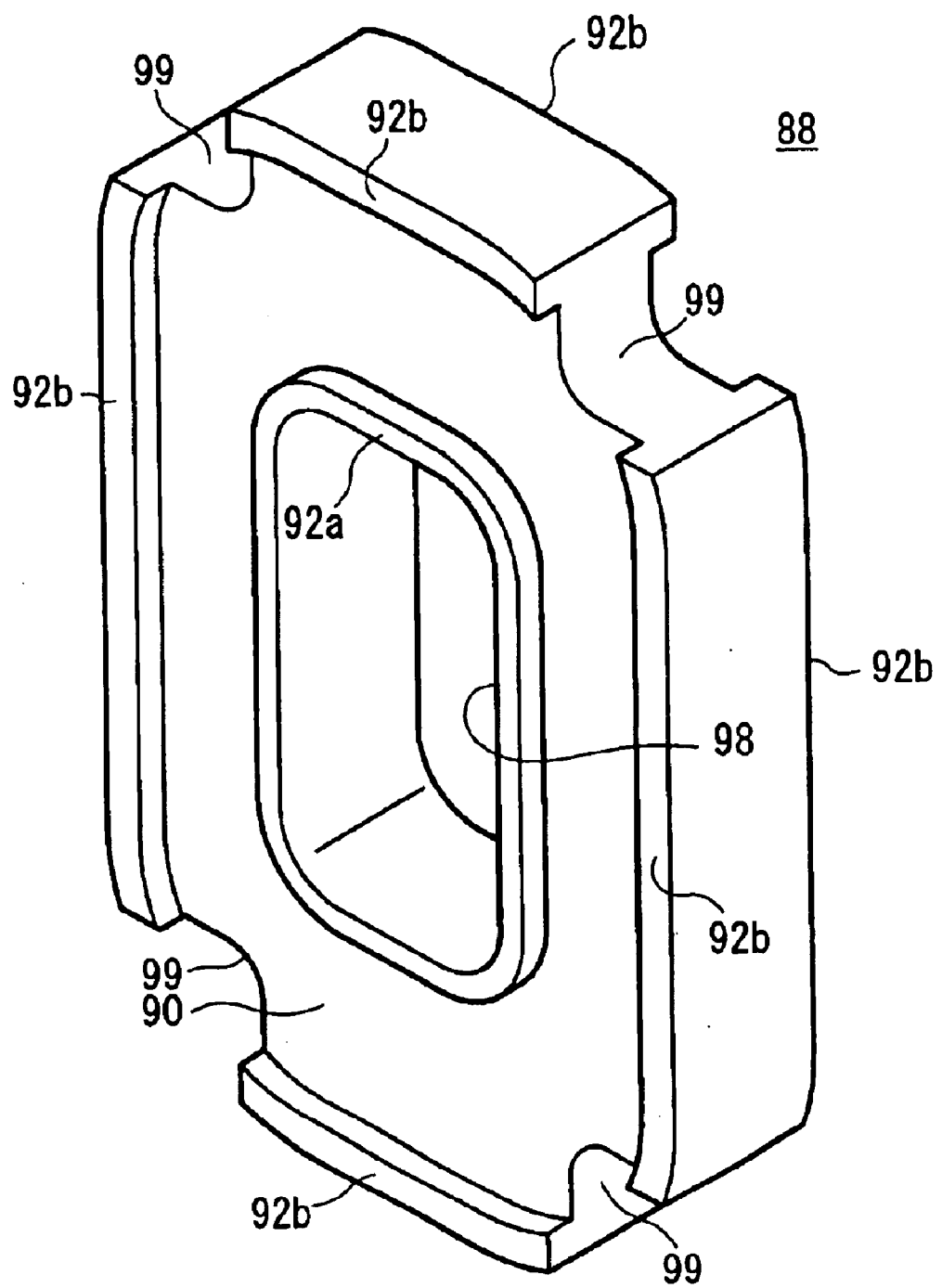
FIG. 6 is a perspective view illustrating the ring member of the solenoid-operated valve shown in FIG. 1.

A ring member 88 made of, for example, a magnetic material such as a permanent magnet is provided between the valve body 48 and the bobbin 82 so that the ring member 88 is interposed between the valve body 48 and the bobbin 82. As shown in FIGS. 5 and 6, the ring member 88 has a plate section 90 which is thin as compared with the other portions, and expanded sections 92a, 92b which protrude by predetermined lengths in the axial direction respectively on the inner circumferential side of the plate section 90 facing the movable iron core 86 and on the outer circumferential side of the plate section 90 facing the bonnet 50. Ends on inner circumferential surfaces of the expanded sections 92a and ends on outer circumferential surfaces of the expanded sections 92b are not chamfered and they are formed to have angular shapes respectively.

Grooves 94a, 94b are formed on the lower surface of the bobbin 82 and on the upper surface of the valve body 48, on the inner circumferential side and on the outer circumferential side thereof. The grooves 94a, 94b are depressed by predetermined lengths to correspond to the cross-sectional shapes of the expanded sections 92a, 92b for engagement.

The expanded sections 92a may be formed on only the inner circumferential side of the ring member 88. Alternatively, for example, the expanded sections 92a may be formed on the inner circumferential side of the ring member 88, and the expanded sections 92b may be formed on the outer circumferential side of the ring member 88.

Figure 17:
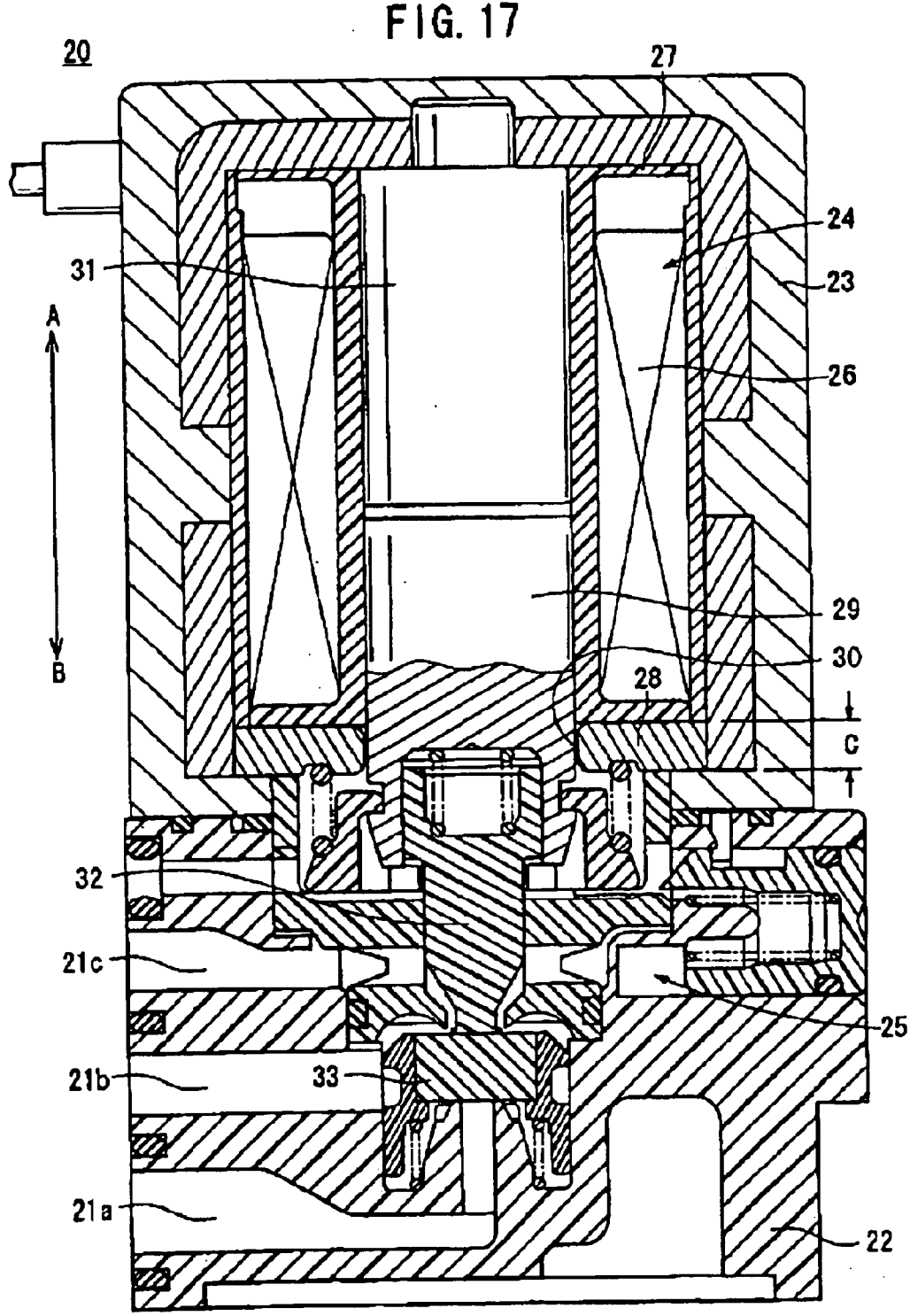
FIG. 17 is a vertical sectional view illustrating another conventional solenoid-operated valve.
Figure 18:
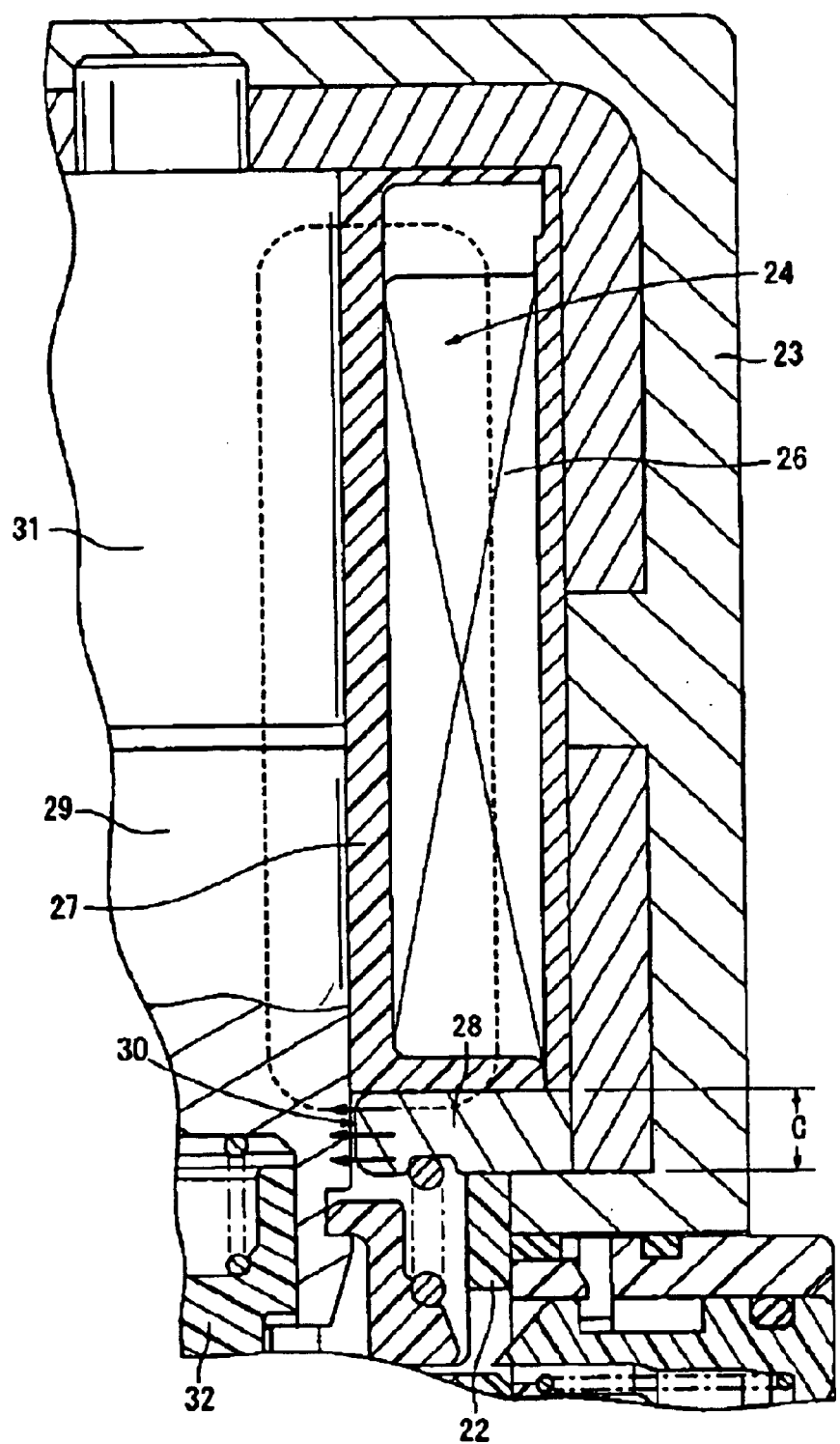
FIG. 18 is, with partial omission, a magnified vertical sectional view illustrating the solenoid-operated valve shown in FIG. 17.

The thickness D of the plate section 90 in the axial direction of the movable iron core 86 is the same as the thickness C (see FIGS. 17 and 18) of the magnetic plate 9 of the conventional solenoid-operated valve 1 (D=C). The thickness E of the expanded sections 92a, 92b in the axial direction of the movable iron core 86 is larger than the thickness D of the plate section 90 (E>D).

The expanded sections 92a, 92b are formed to provide a substantially I-shaped cross section with protrusions in both of the upward and downward directions in the axial direction. The cross-sectional shape of the ring member 88 is not limited to the I-shaped cross section, but may be any shape provided that the portion on the side of the movable iron core 86 and the portion on the side of the bonnet 50 are expanded by predetermined lengths in the axial direction with respect to the plate section 90.

The ring member 88 of a magnetic material may be made of a metal material different from a resin material of the bobbin 82. Further, the ring member 88 may be integrally formed with the bobbin 82. That is, when the ring member 88 and the bobbin 82 are formed integrally, the axial center of the ring member 88 can be identical with the axial center of the bobbin 82. Therefore, the movable iron core 86 which is slidable in the axial direction in the bobbin 82 is prevented from contacting the inner circumferential surface of the ring member 88, which would be otherwise caused by any deviation between the axial centers of the ring member 88 and the bobbin 82.

A second seal member 96 is attached to a groove of the guide member 62 at the joining surface between the ring member 88 and the guide member 62. The ring member 88 has a hole 98 therein through which the movable iron core 86 is inserted. A clearance is provided between the outer circumferential surface of the movable iron core 86 and the hole 98 of the ring member 88 by a predetermined distance. Therefore, the ring member 88 and the movable iron core 86 make no contact, and no sliding resistance is generated for the movable iron core 86.

Further, as shown in FIG. 6, cutouts 99 are formed at four corners of the ring member 88 respectively. In assembling, the cutouts 99 are engaged with unillustrated projections formed on the valve body 48. As a result, the axial center of the ring member 88 is prevented from displacement, and thus the ring member 88 is reliably positioned.

A third seal member 100 is attached to a groove formed at an upper portion of the bobbin 82 between the bobbin 82 and the bonnet 50 to retain the air-tightness for the bobbin 82 and the bonnet 50.

The valve mechanism 54 includes a valve plug 102 directly connected to the movable iron core 86 for moving together with the movable iron core 86, an elastic section 104 which is attached to a substantially central portion of the valve plug 102, and a single spring member 106 which is interposed between the valve plug 102 and a step of the second valve seat 66 of the guide member 62.

Figure 7:
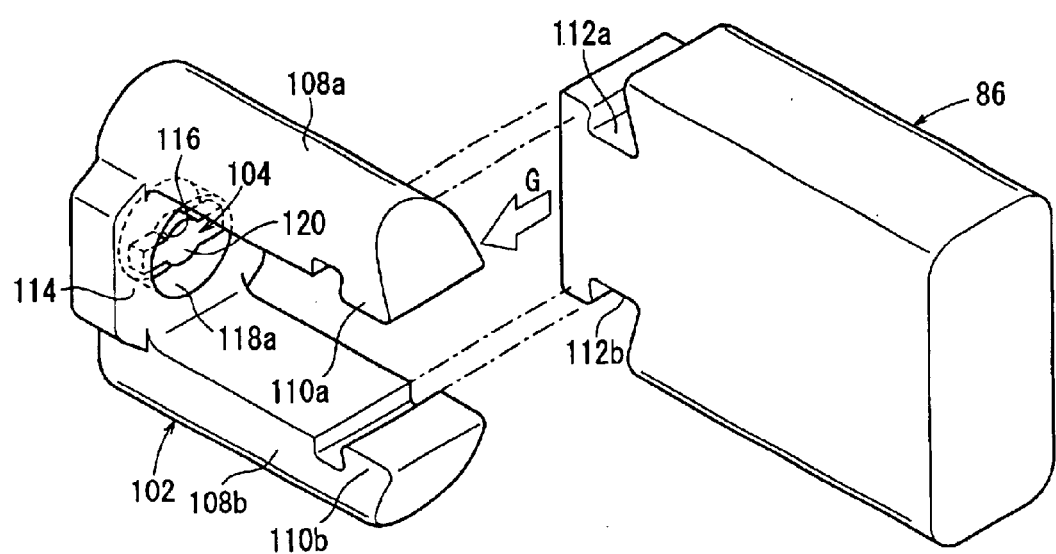
FIG. 7 illustrates the assembling of a valve plug and a movable iron core of the solenoid-operated valve shown in FIG. 1.
Figure 8:
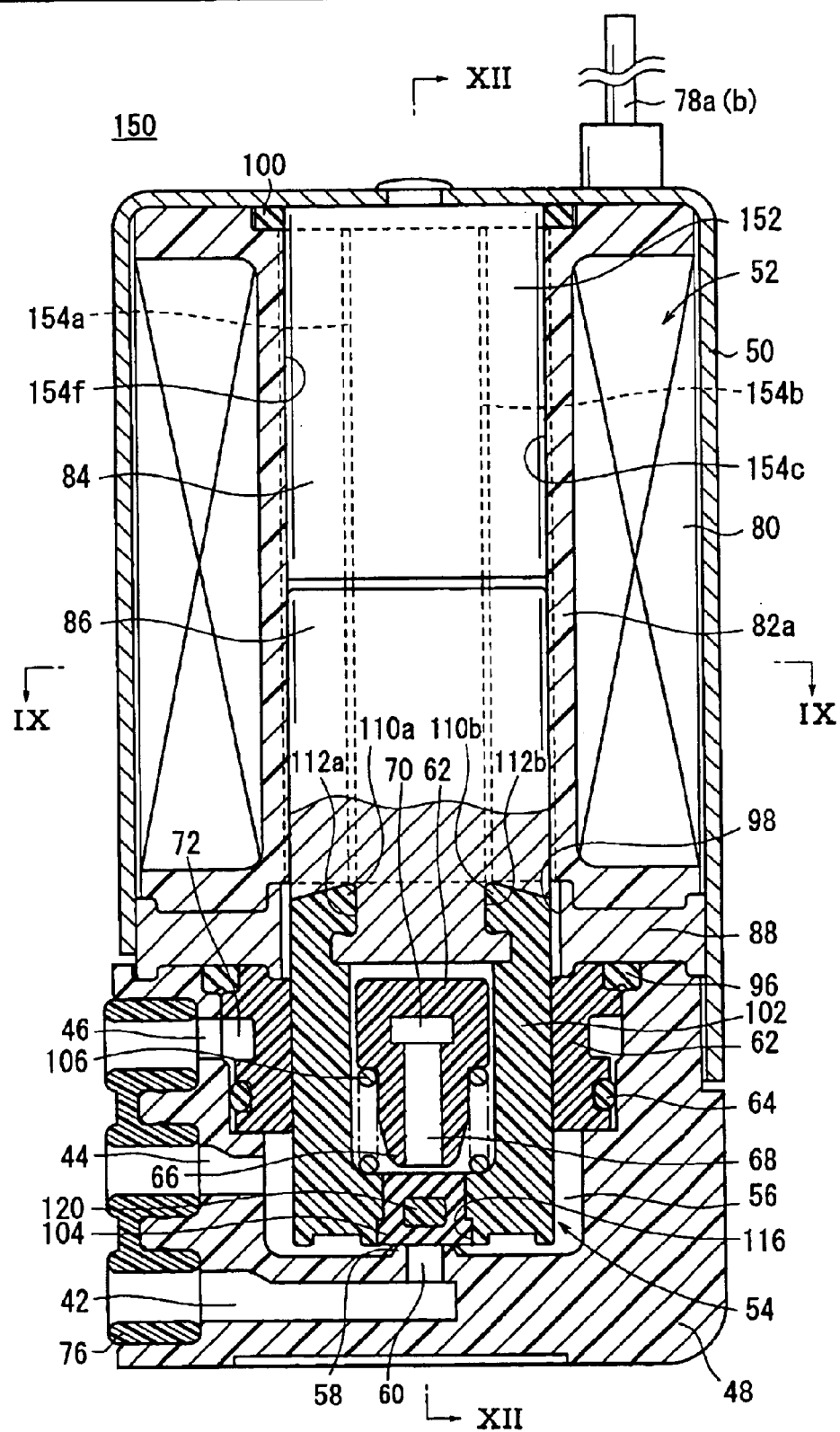
FIG. 8 is a vertical sectional view when a solenoid-operated valve according to a second embodiment of the present invention is closed.

The valve plug 102 is formed to have a substantially U-shaped cross section (see FIGS. 1 and 3), branching into two arms 108a, 108b. A pair of engaging pawls 110a, 110b are formed at ends of the arms 108a, 108b of the valve plug 102. The engaging pawls 110a, 110b are expanded inwardly by predetermined lengths. The engaging pawls 110a, 110b are engaged with engaging grooves 112a, 112b formed on the side surfaces of the movable iron core 86. The engaging grooves 112a, 112b have shapes corresponding to the shapes of the engaging pawls 110a, lob. As shown in FIG. 7, the engaging pawls 110a, 110b are inserted into the engaging grooves 112a, 112b by displacing the movable iron core 86 substantially horizontally in the direction of the arrow G with respect to the valve plug 102. As a result, the valve plug 102 is connected to the movable iron core 86 reliably and directly (see FIGS. 1 and 3). The valve plug 102 is displaced together with the movable iron core 86.

Second ends of the arms 108a, 108b are connected by a connecting section 114. The elastic section 104 at a substantially central portion of the connecting section 114 is formed integrally, in which a melted resin material is provided and solidified in an installation hole 116 formed at a substantially central portion of the valve plug 102. That is, the elastic section 104 is integrally attached to the valve plug 102 as a result of the solidification of the melted resin material provided in the installation hole 116. An upper surface 118a and a lower surface 118b of the elastic section 104 are exposed to the outside (see FIGS. 1 and 3).

A connecting rod 120 is provided at a substantially central portion in the installation hole 116, for connecting between the inner circumferential surfaces. The resin material provided in the installation hole 116 is solidified so that the connecting rod 120 is surrounded thereby. Therefore, the elastic section 104 is prevented from disengagement from the installation hole 116.

As a result, as shown in FIG. 1, when the elastic section 104 is seated on the first valve seat 58 when the movable iron core 86 is displaced, the elastic section 104 is pressed against the first valve seat 58, and thus the air-tightness is reliably retained for the passage 60 and the chamber 56. In this situation, the spring member 106 urges the valve plug 102 so that the valve plug 102 is pressed against the first valve seat 58.

The solenoid-operated valve 40 according to the first embodiment of the present invention is basically constructed as described above. Next, its operation, function, and effect will be explained.

FIG. 1 shows a non-excited state in which no current is supplied to the coil 80. Further, FIG. 1 shows an OFF state in which the lower surface 118b of the elastic section 104 of the valve plug 102 is seated on the first valve seat 58 by the spring force of the spring member 106 to interrupt the communication between the first port 42 and the second port 44.

In this situation, as shown in FIG. 2, as for the second port 44, the chamber 56 is communicated with the first communication passage 68 via the gap defined by the upper surface 118a of the elastic section 104, the second valve seat 66 of the guide member 62, and the flange section 74. Therefore, the second port 44 is communicated with the third port 46 via the second communication passage 70 and the recess 72. As a result, the chamber 56, which is communicated with the third port 46 communicating with the outside, is open to the atmosphere.

Starting from the OFF state as described above, the coil 80 is magnetically excited by energizing the unillustrated power source to apply the electric power to the coil 80. As shown in FIG. 5, the magnetic flux is directed from the coil 80 toward the ring member 88 under the magnetic excitation.

The magnetic flux is generated such that the magnetic flux is directed from the expanded sections 92a of the ring member 88 via the movable iron core 86 toward the fixed iron core 84, and the magnetic flux is returned to the coil 80. The thickness E in the axial direction of the ring member 88 facing the movable iron core 86 can be increased as compared with the thickness C (see FIG. 18) of the magnetic plate 9 of the conventional solenoid-operated valve 1, by providing the expanded sections 92a, 92b in which the end surfaces of the ring member 88 on the side of the movable iron core 86 protrude by the predetermined lengths in the axial direction. As a result, the area of the ring member 88 facing the movable iron core 86 is large, and the density of the magnetic flux directed from the coil 80 toward the movable iron core 86 is increased (see arrows in FIG. 5). Therefore, the attracting force of the movable iron core 86 is increased as compared with the conventional solenoid-operated valve 1.

As shown in FIGS. 1 and 2, the movable iron core 86 is attracted toward the fixed iron core 84 of the bonnet 50 (in the direction of the arrow X1) under the magnetic excitation of the coil 80. As a result, as shown in FIGS. 3 and 4, the solenoid-operated valve 40 is switched from the OFF state to the ON state.

The movable iron core 86 is displaced by a minute distance toward the fixed iron core 84 (in the direction of the arrow X1) against the spring force of the spring member 106, and thus the valve plug 102, which is connected to the movable iron core 86, is moved upwardly together. Then, the upper end of the movable iron core 86 abuts against the end surface of the fixed iron core 84 at the displacement terminal position.

Therefore, the lower surface 118b of the elastic section 104 of the valve plug 102 is separated from the first valve seat 58 when the movable iron core 86 is displaced. Accordingly, in the ON state as shown in FIG. 3, the first port 42 is communicated with the second port 44 via the passage 60 and the chamber 56. As a result, the pressure fluid supplied via the first port 42 by the unillustrated pressure fluid supply source passes through the gap between the elastic section 104 and the first valve seat 58, and the pressure fluid is supplied via the chamber 56 and the second port 44 to the unillustrated fluid pressure-operated apparatus.

During this process, the upper surface 118a of the elastic section 104 abuts against the end of the second valve seat 66 and the end of the flange section 74 when the valve plug 102 is displaced. Accordingly, the first communication passage 68 is closed, and the communication is interrupted between the first communication passage 68 and the chamber 56. The attracting force displacing the movable iron core 86 upwardly is applied to the elastic section 104 of the valve plug 102. Therefore, the upper surface 118a of the elastic section 104 is strongly pressed against the end of the second valve seat 66. Thus, the air-tightness is retained more reliably for the first communication passage 68. That is, it is possible to more reliably seal the communication between the second port 44 and the third port 46.

As described above, in the first embodiment, the movable iron core 86 is directly connected to the valve plug 102 by engaging the engaging pawls 110a, 10b of the valve plug 102 with the engaging grooves 112a, 112b of the movable iron core 86. Further, the elastic section 104 is provided at the connecting section 114 of the valve plug 102. As a result, the first and second valve seats 58, 66 can be alternately opened/closed by the upper surface 118a and the lower surface 118b of the elastic section 104 of the connecting section 114 when the movable iron core 86 is displaced.

Figure 16:
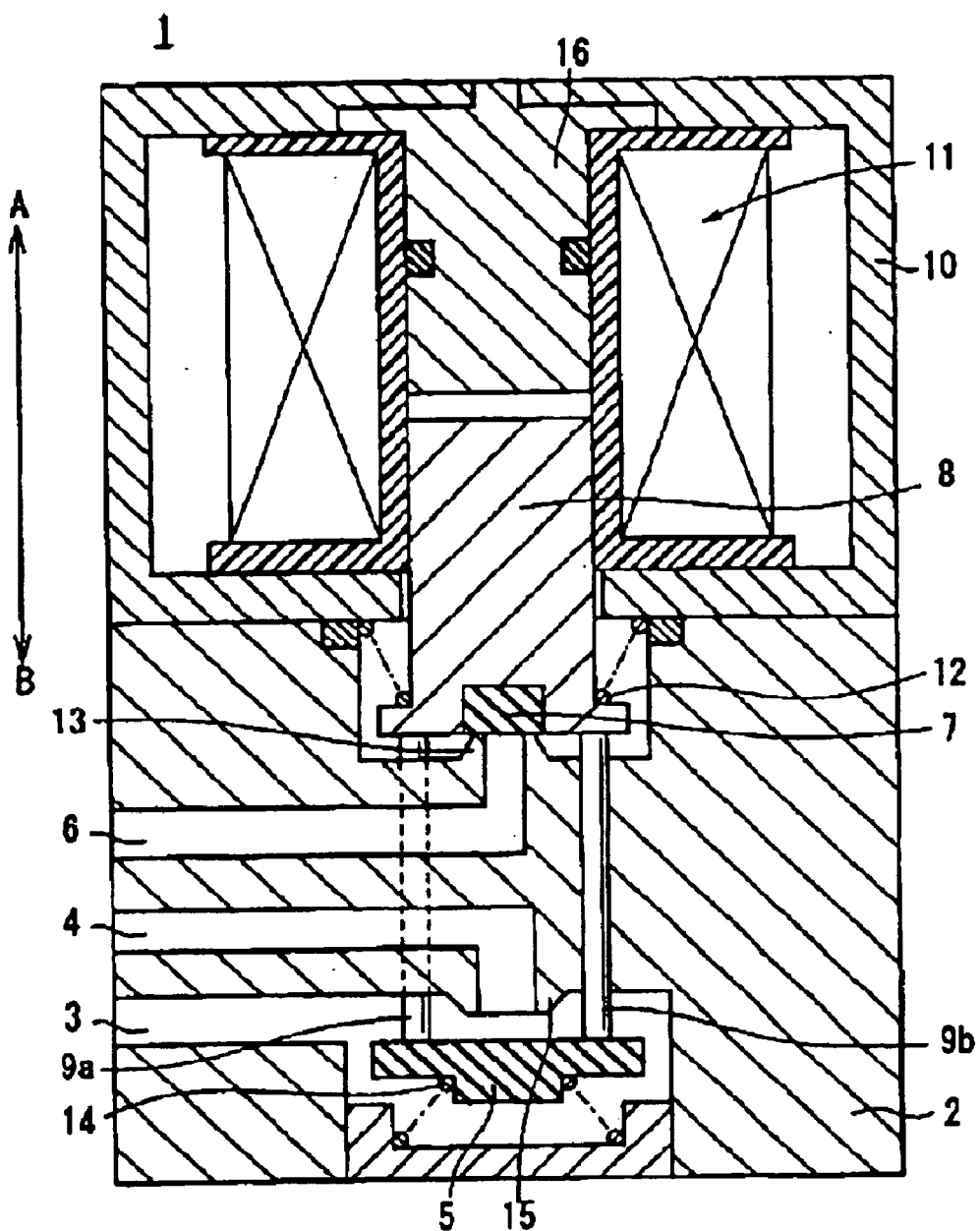
FIG. 16 is a vertical sectional view illustrating a conventional solenoid-operated valve.

Therefore, it is unnecessary to provide the two opening/closing members such as the valve plug 5 and the seal member 7 of the movable iron core 8 in the conventional art as shown in FIG. 16. As a result, it is possible to simplify the structure of the solenoid-operated valve 40, and it is possible to reduce the number of parts.

The first and second springs 12, 14, which are arranged for both of the movable iron core 8 and the valve plug 5 in the conventional solenoid-operated valve 1 as shown in FIG. 16, can be replaced with the single spring member 106 in the solenoid-operated valve 40 according to the first embodiment. Therefore, it is unnecessary to adjust the spring forces of both springs 12, 14 for controlling the seating forces of the valve plug 5 and the seal member 7.

Further, in the first embodiment, the pressing force of the elastic section 104 exerted when the elastic section 104 is seated on the second valve seat 66 is accelerated by the attracting force exerted on the movable iron core 86. Therefore, it is possible to further improve the seating force and it is possible to obtain stable seating force, as compared with the pressing forces exerted on the seats 13, 15 by the conventional springs 12, 14 shown in FIG. 16. Thus, it is possible to reliably secure the air-tightness for the second valve seat 66.

Further, in the first embodiment, the valve plug 102 is directly connected to the movable iron core 86, and thus the valve plug 102 is displaced together with the displacement of the movable iron core 86. Therefore, it is possible to further improve the response in opening/closing the valve plug 102 with respect to the displacement of the movable iron core 86.

Further, in the first embodiment, the expanded sections 92a, 92b protruding by the predetermined lengths in the axial direction respectively are provided on the inner circumferential side of the ring member 88 facing the movable iron core 86 and on the outer circumferential side of the ring member 88 facing the bonnet 50. As a result, when the magnetic flux is directed from the coil 80 toward the ring member 88 under the magnetic excitation of the coil 80, it is possible to increase the density of the magnetic flux from the expanded sections 92a toward the movable iron core 86, because the surface area of the ring member 88 facing the movable iron core 86 is increased. Additionally, the attracting force of the movable iron core 86 can be increased as compared with the conventional art, because it is possible to increase the density of the magnetic flux toward the movable iron core 86.

Further, in the first embodiment, the expanded sections 92b are formed on the outer circumferential side of the ring member 88 in addition to the expanded sections 92a. Thus, it is possible to further increase the magnetic flux density as compared with a case in which the expanded sections 92a are formed only on the inner circumferential side. Therefore, it is possible to further increase the attracting force.

The functions and effects of solenoid-operated valves according to the following embodiments that are the same as those of the solenoid-operated valve 40 according to the first embodiment described above will not be explained in detail.

Next, a solenoid-operated valve 150 according to a second embodiment is shown in FIGS. 8 to 12. The constituent components that are same as those of the solenoid-operated valve 40 shown in FIGS. 1 to 4 are designated by the same reference numerals, detailed explanation of which will be omitted.

The solenoid-operated valve 150 according to the second embodiment has a plurality of support sections 154a to 154f which protrude by predetermined lengths opposingly toward the movable iron core 86 on the inner circumferential surface of a hole 152 of a bobbin 82a.

The support sections 154a to 154f are formed and spaced from each other by predetermined distances in the circumferential direction. The support sections 154a and 154e, 154b and 154d, and 154c and 154f are formed opposingly as pairs respectively on the inner circumferential surface of the hole 152 of the bobbin 82a (see FIG. 9).

The support sections 154a to 154f are formed and spaced from each other by the predetermined distances in the circumferential direction, and thus the sliding surface for the movable iron core 86 can be supported substantially equivalently by the support sections 154a to 154f. In other words, in order to support the sliding surface of the bobbin 82a substantially equivalently, the number of the support sections 154a to 154f may be increased or decreased in proportion to the circumferential dimension of the inner circumferential surface of the hole 152 of the bobbin 82a.

Figure 10:
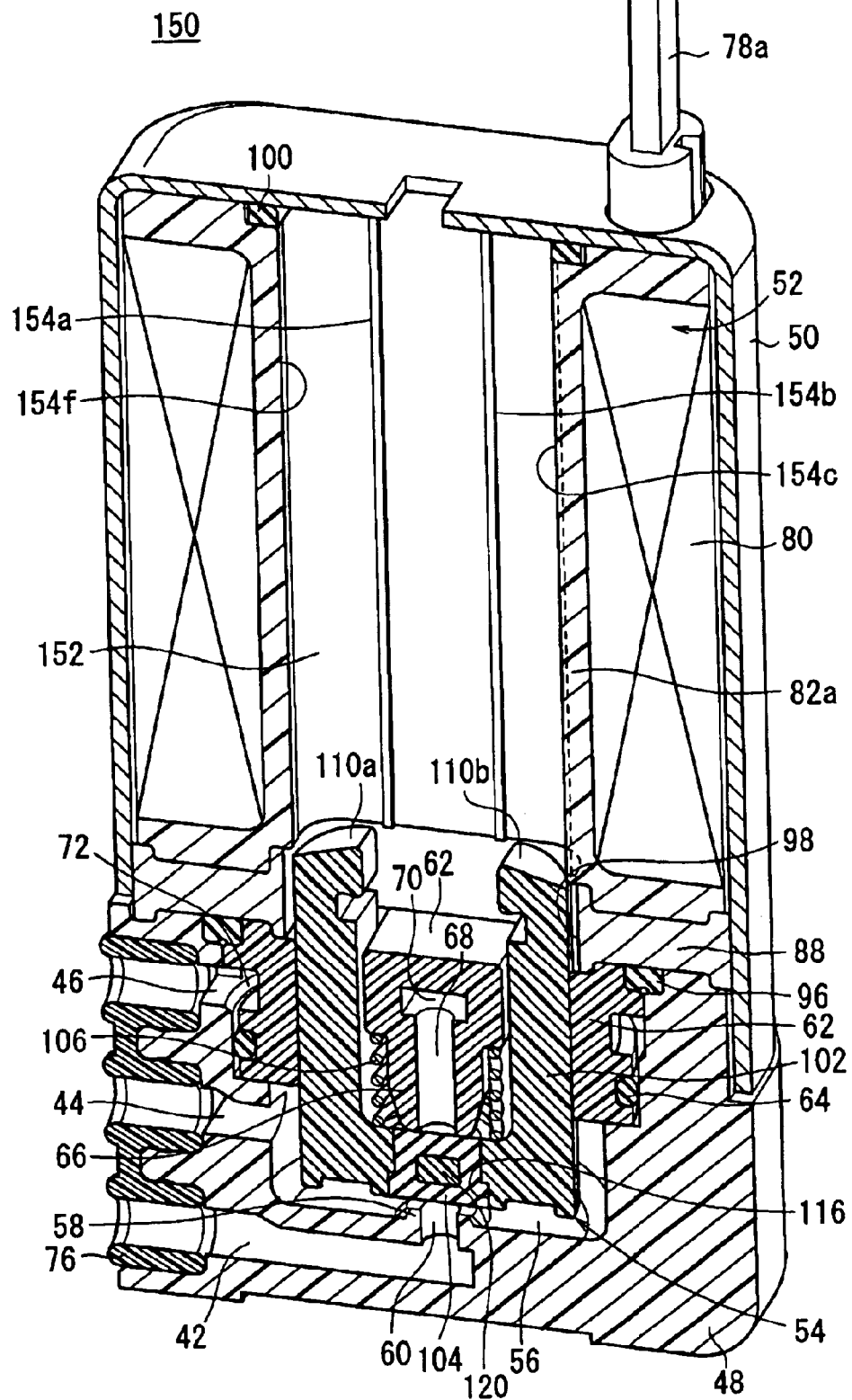
FIG. 10 is a perspective view depicting a vertical cross section illustrating support sections formed on a hole of a coil by removing a movable iron core and a fixed iron core shown in FIG. 8.

Further, as shown in FIG. 10, the support sections 154a to 154f are formed to extend by predetermined lengths in the axial direction within the sliding range of the movable iron core 86 from the positions in the vicinity of the engaging pawls 110a, 110b of the valve plug 102, and the plurality of support sections 154a to 154f are formed to abut against the sliding surface of the movable iron core 86. That is, when the movable iron core 86 is displaced in the axial direction under the magnetic excitation of the coil 80, the movable iron core 86 slides on the flat surfaces of the opposing support sections 154a to 154f.

The support sections 154a to 154f may extend only within the sliding range of the movable iron core 86 without forming the support sections 154a to 154f to extend from the movable iron core 86 to the fixed iron core 84 in the axial direction.

Figure 11:
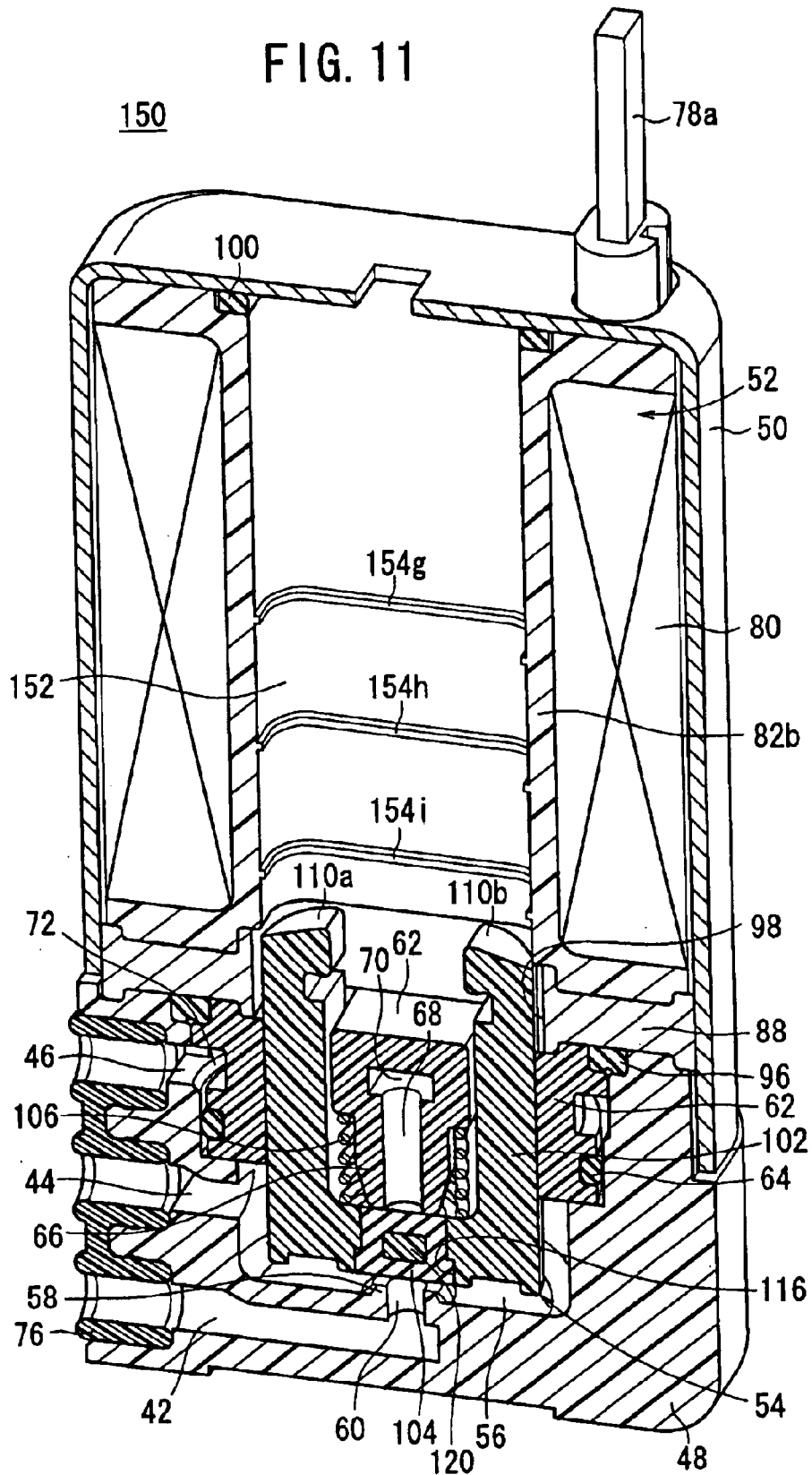
FIG. 11 is a perspective view depicting a vertical cross section illustrating a modified embodiment of the support sections shown in FIG. 10.
Figure 12:
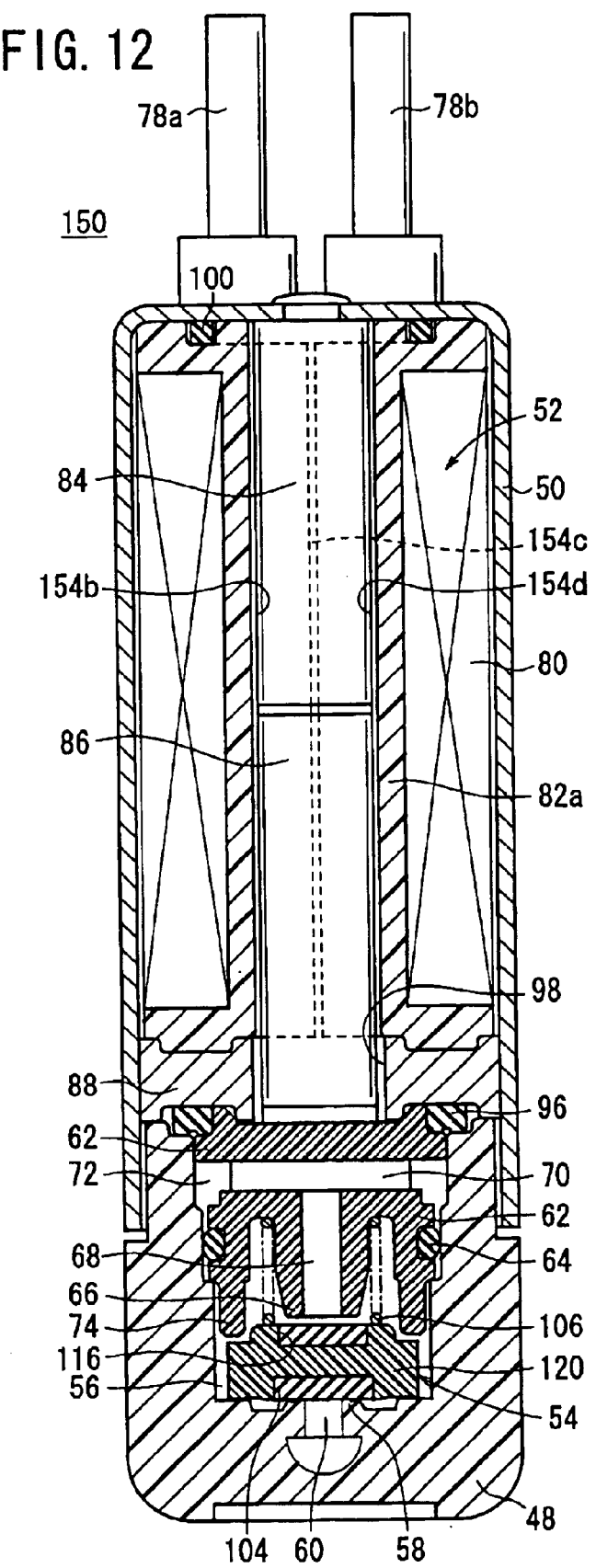
FIG. 12 is a vertical sectional view taken along a line XII—XII shown in FIG. 8.

The shapes of the support sections 154a to 154f are not limited to the shapes disposed in the axial direction of the movable iron core 86. Alternatively, as shown in FIG. 11, a plurality of support sections 154g to 154i may be formed to go around in the circumferential direction substantially perpendicular to the axis within the range of the sliding movement of the movable iron core 86, in which the plurality of support sections 154g to 154i may be spaced from each other by predetermined distances. That is, when the support sections 154g to 154i are spaced from each other by the predetermined distances, it is possible to support the sliding surface of the movable iron core 86 substantially equivalently.

Figure 9:
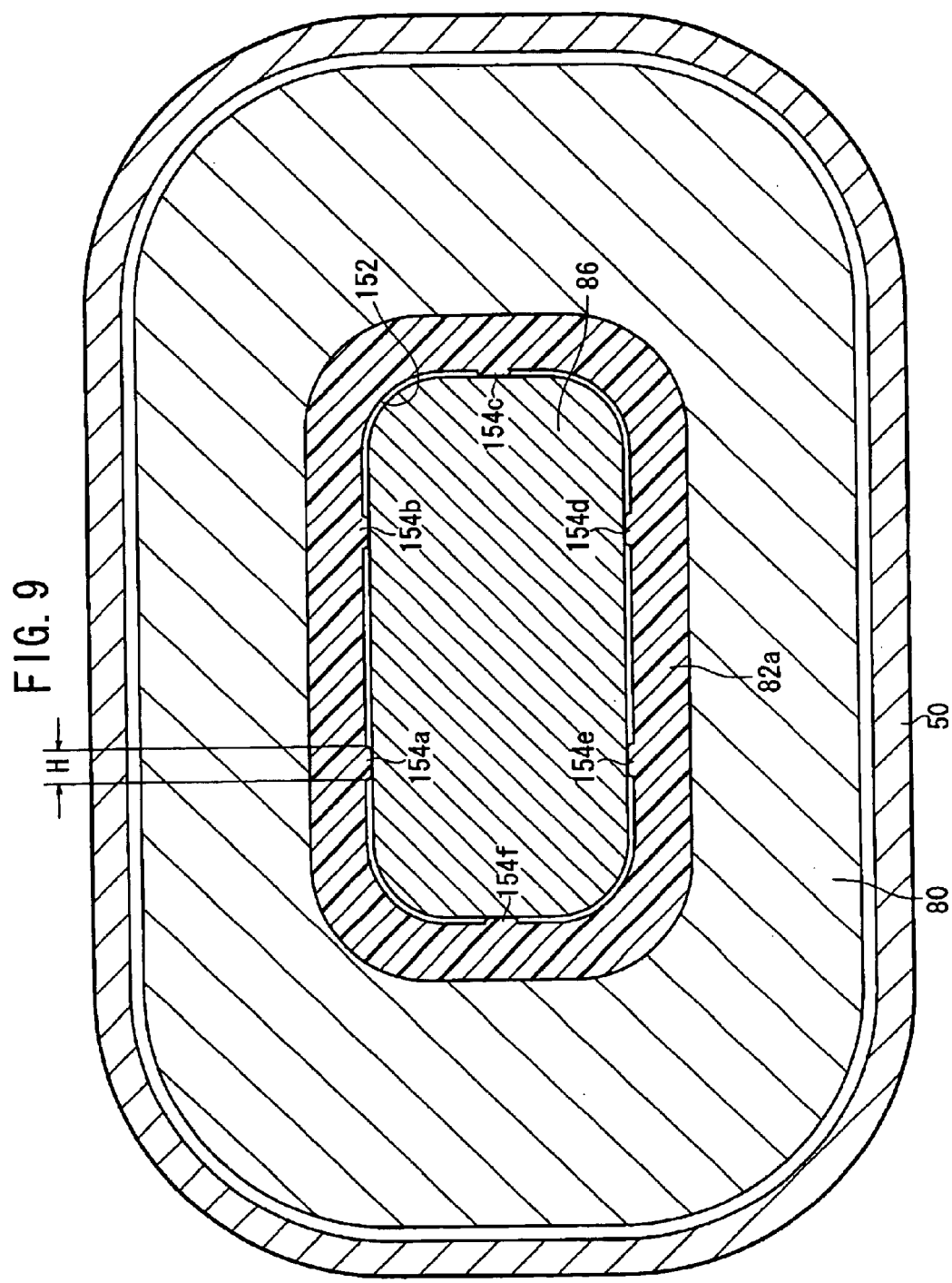
FIG. 9 is a lateral sectional view taken along a line IX—IX shown in FIG. 8.

Further, when the dimension H in the width of the support section 154a shown in FIG. 9 is decreased, the contact area with respect to the movable iron core 86 is further decreased as compared with the conventional solenoid-operated valve. Thus, it is possible to reduce the sliding resistance.

In the solenoid-operated valve 150 according to the second embodiment, the plurality of support sections 154a to 154f, 154g to 154i protrude by the predetermined lengths toward the movable iron core 86 on the inner circumferential surface of the hole 152 of the bobbin 82a (b) for inserting the movable iron core 86 thereinto. The movable iron core 86 slides along the support sections 154a to 154f, 154g to 154i. Accordingly, the contact area between the movable iron core 86 and the bobbin 82a (b) is smaller than that of the conventional solenoid-operated valve. Therefore, it is possible to reduce the sliding resistance of the movable iron core 86. As a result, it is possible to displace the movable iron core 86 more smoothly, and it is possible to improve the response speed of the solenoid-operated valve 150.

When the support sections 154a to 154f, 154g to 154i are provided, the contact area between the movable iron core 86 and the bobbin 82a (b) is reduced as compared with the conventional solenoid-operated valve. Therefore, it is possible to reduce the abrasion generated in contacting during the sliding movement between the movable iron core 86 and the bobbin 82a (b). As a result, it is possible to improve the durability of the bobbin 82a (b) made of, for example, a resin material, and it is possible to prolong a maintenance cycle.

Figure 13:
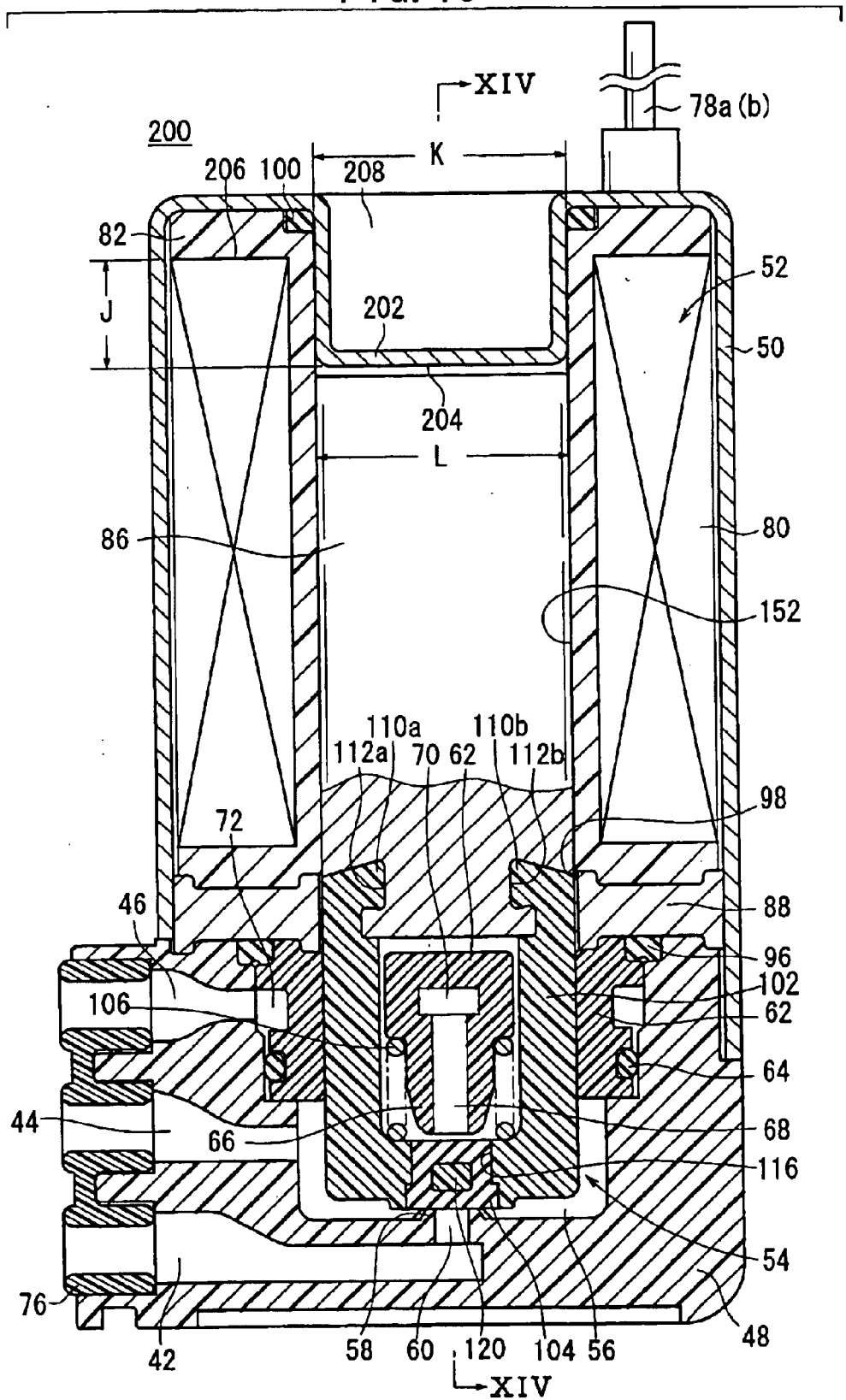
FIG. 13 is a vertical sectional view when a solenoid-operated valve according to a third embodiment of the present invention is closed.
Figure 14:
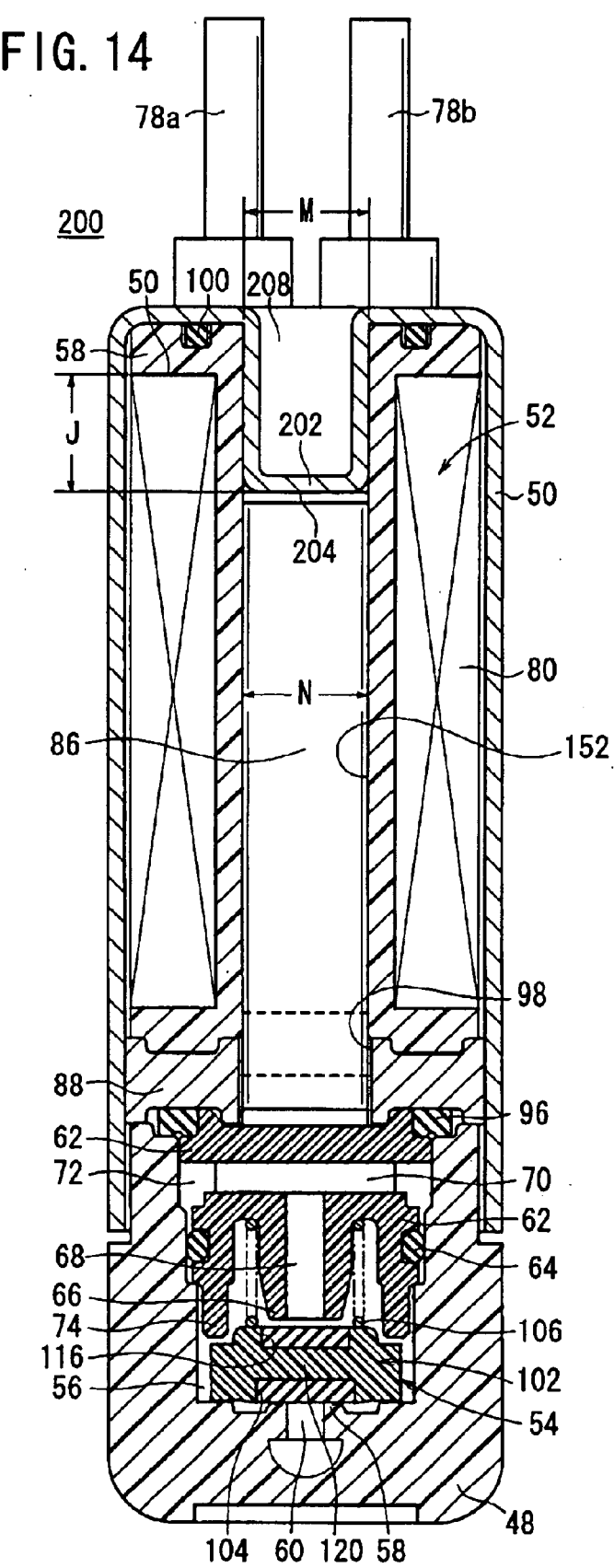
FIG. 14 is a vertical sectional view taken along a line XIV—XIV shown in FIG. 13.
Figure 15:
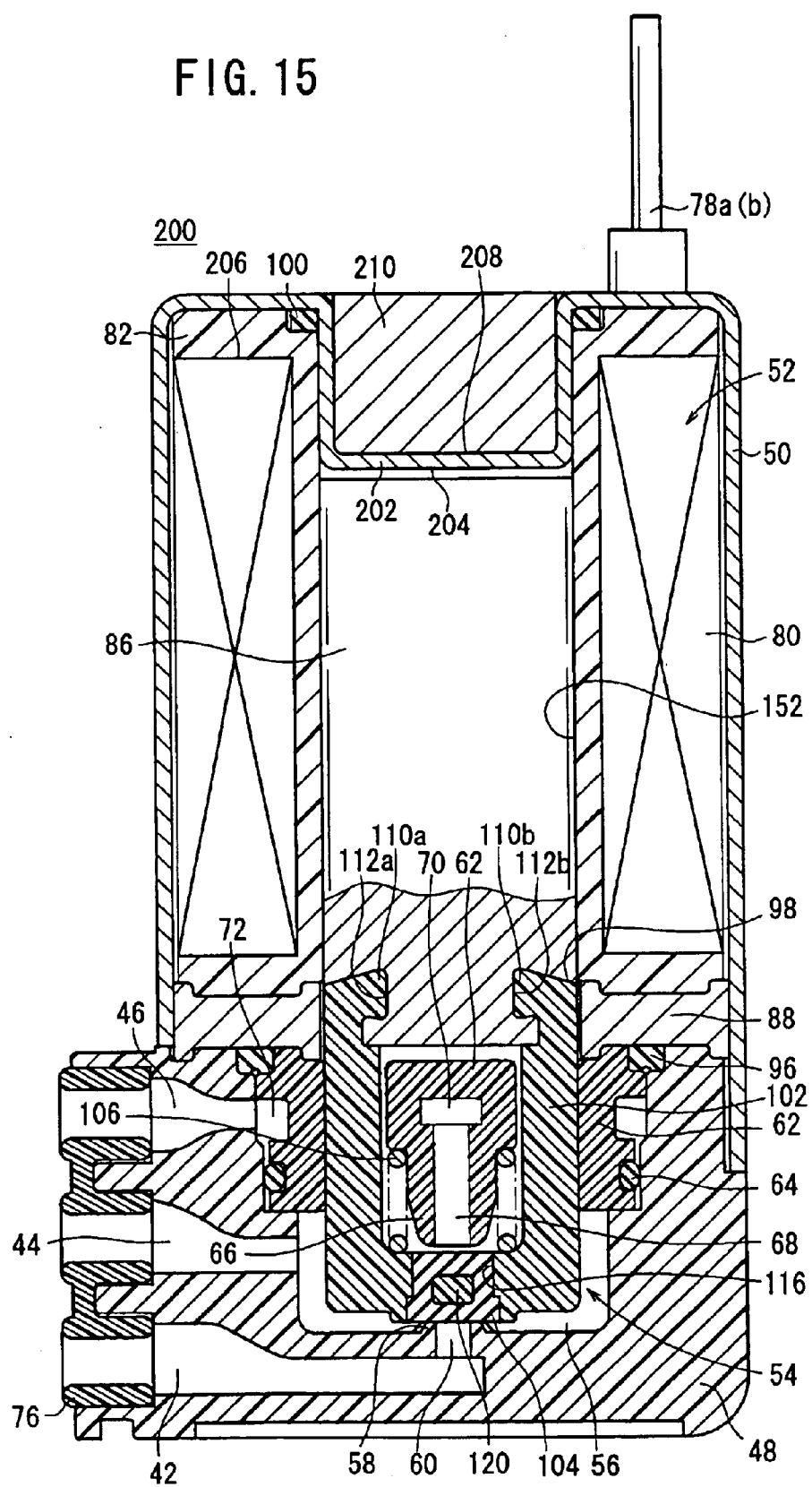
FIG. 15 is a vertical sectional view showing that a metal member is installed to a depression shown in FIG. 13.

Next, a solenoid-operated valve 200 according to a third embodiment is shown in FIGS. 13 to 15. The constituent components that are same as those of the solenoid-operated valve 40 shown in FIGS. 1 to 4 are designated by the same reference numerals, detailed explanation of which will be omitted.

The solenoid-operated valve 200 according to the third embodiment has a protrusion 202 which protrudes coaxially by a predetermined length toward the movable iron core 86 at a substantially upper central portion of a bonnet (frame member) 50 to face the coil 80 arranged in the solenoid 52.

The protrusion amount J of the protrusion 202 is set so that an end surface 204 of the protrusion 202 protrudes toward the movable iron core 86 at least over an upper end surface 206 of the coil 80 (see FIGS. 13 and 14). That is, a part of the protrusion 202 is overlapped with a part of the coil 80 in the axial direction, and thus the movable iron core 86 can be attracted toward the protrusion 202 under the magnetic excitation of the coil 80.

When the protrusion amount J of the protrusion 202 toward the movable iron core 86 is increased, it is possible to obtain the magnetic force which is proportional to the protrusion amount J. Therefore, the attracting force to be exerted on the movable iron core 86 is further increased.

The dimension K as the width of the protrusion 202 (see FIG. 13) is substantially equivalent to the dimension L in the width of the movable iron core 86 (see FIG. 13). Additionally, the dimension M as the thickness of the protrusion 202 (see FIG. 14) is substantially equivalent to the dimension N as the thickness of the movable iron core 86 (see FIG. 14). That is, the contour shape of the end surface of the protrusion 202 (see reference symbol K in FIG. 13 and reference symbol M in FIG. 14) is substantially rectangular in cross section substantially equivalently to the contour shape of the movable iron core 86 (see reference symbol L in FIG. 13 and reference symbol N in FIG. 14).

Further, when the protrusion 202 made of a metal material protrudes by the predetermined length toward the movable iron core 86 over the movable iron core 86 and the contour shape of the protrusion 202 is made substantially equivalent to that of the movable iron core 86, the conventional fixed iron core is unnecessary.

As shown in FIGS. 13 and 14, a pair of lead wires 78a, 78b are connected at positions spaced by predetermined lengths toward the outer circumference from the protrusion 202, for supplying the current from the unillustrated power source to the solenoid 52.

If a larger attracting force is required, as shown in FIG. 15, an additional member 210 made of a metal material may be attached to a depression 208 disposed opposite with the protrusion 202 of the bonnet 50.

The solenoid-operated valve 200 according to the third embodiment is provided with the protrusion 202 which protrudes coaxially toward the movable iron core 86 at the substantially central portion of the bonnet 50 in place of the conventional fixed iron core. As a result, it is possible to attract the movable iron core 86 by the protrusion 202 of the bonnet 50 under the magnetic excitation of the solenoid 52. As a result, the fixed iron core is unnecessary. Therefore, it is possible to reduce the number of parts, and it is possible to reduce the cost.

Further, when the additional member 210 made of the metal material is attached to the depression 208 of the bonnet 50, it is possible to obtain larger attracting force with the protrusion 202 and the additional member 210 than with the protrusion 202 only.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A solenoid-operated valve comprising a valve plug displaced by attracting a movable iron core under magnetic excitation of a solenoid, wherein said valve plug is directly connected to said movable iron core, and said valve plug seats on or separates from a valve seat formed on a valve body in accordance with displacement of said movable iron core, so that communication of fluid between a plurality of ports formed in said valve body is switched, wherein a ring member of a magnetic material surrounds said movable iron core, first expanded sections protrude in one direction and in the other direction along an axis of said movable iron core, and said first expanded sections extend alone an inner circumferential surface of said ring member.

2. The solenoid-operated valve according to claim 1, wherein said valve plug has a substantially U-shaped cross section and is provided with a pair of arms extending in parallel to and being spaced from one another by a predetermined distance.

3. The solenoid-operated valve according to claim 2, wherein said arms are provided with engaging pawls, said engaging pawls being fitted to engaging grooves formed on side surfaces of said movable iron core.

4. The solenoid-operated valve according to claim 2, wherein said valve plug is provided with a connecting section for connecting ends of said pair of arm.

5. The solenoid-operated valve according to claim 4, wherein an elastic section for being seated on said valve seat is integrally attached to said connecting section.

6. The solenoid-operated valve according claim 1, wherein second expanded sections protrude in said one direction and in said other direction along said axis of said movable iron core substantially around an outer circumferential surface of said ring member.

7. The solenoid-operated valve according to claim 1, wherein said ring member is provided with cutouts by cutting out four corners of said ring member in circular arc-shaped forms.

8. The solenoid-operated valve according to claim 1, wherein said first expanded sections are engaged with grooves formed on a bobbin in said solenoid arid a guide member, respectively.

9. The solenoid-operated valve according to claim 6, wherein said second expanded sections are engaged with grooves formed on a bobbin in said solenoid and a valve body, respectively.

10. The solenoid-operated valve according to claim 1, wherein said ring member is made of a metal material, maid ring member is arranged in said solenoid, and said ring member is integrally formed with a bobbin.

11. The solenoid-operated valve according to claim 1, wherein said solenoid has a hollow bobbin around which a coil is wound, and a support section protruding toward said movable iron core from an inner circumferential surface of a hole of said bobbin; and said support section is engaged with an outer wall surface of said movable iron core.

12. The solenoid-operated valve according to claim 11, wherein said support section is formed in an axial direction of said movable iron core.

13. The solenoid-operated valve according to claim 12, wherein a plurality of said support sections are provided and spaced from each other by predetermined distances.

14. The solenoid-operated valve according to claim 11, wherein said support section is formed in a direction substantially perpendicular to an axis of said movable iron core.

15. The solenoid-Operated valve according to claim 14, wherein a plurality of support sections are spaced from each other by predetermined distances.

16. A solenoid-operated valve according to claim 1, said solenoid-operated valve further comprising:

a protrusion that protrudes from a side wall of a metal frame member surrounding said solenoid, said protrusion of said frame member protruding toward said movable iron core in an axial direction of said movable iron core, wherein an end surface of said protrusion faces a coil arranged in said solenoid.

17. The solenoid-operated valve according to claim 16, wherein said protrusion is formed coaxially with said movable iron core.

18. The solenoid-operated valve according to claim 16, wherein said protrusion protrudes along a hole of a bobbin around which said coil is wound.

19. The solenoid-operated valve according to claim 16, wherein a depression is formed on an outer wall surface of said frame member at which said protrusion is formed.

20. The solenoid-operated valve according to claim 19, wherein an additional member is integrally attached to said depression.

\* \* \* \* \*